(12) United States Patent
Koneru

(10) Patent No.: US 11,397,629 B1
(45) Date of Patent: Jul. 26, 2022

(54) AUTOMATED RESOLUTION ENGINE

(71) Applicant: Wells Fargo Bank, N.A., San Francisco, CA (US)

(72) Inventor: Rajesh Koneru, Rock Hill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/142,571

(22) Filed: Jan. 6, 2021

(51) Int. Cl.
*G06F 11/07* (2006.01)
*G06F 11/30* (2006.01)
*G06F 11/34* (2006.01)

(52) U.S. Cl.
CPC ...... *G06F 11/0709* (2013.01); *G06F 11/0772* (2013.01); *G06F 11/0787* (2013.01); *G06F 11/0793* (2013.01); *G06F 11/3006* (2013.01); *G06F 11/3476* (2013.01)

(58) Field of Classification Search
CPC ............. G06F 11/0793; G06F 11/0709; G06F 11/0722; G06F 11/0787; G06F 11/3006; G06F 11/3476
See application file for complete search history.

(56) References Cited

U.S. PATENT DOCUMENTS

| | | | |
|---|---|---|---|
| 6,487,677 B1 * | 11/2002 | Jantz | G06F 11/0748 714/2 |
| 7,065,536 B2 | 6/2006 | Bachman et al. | |
| 8,200,610 B1 | 6/2012 | Birch et al. | |
| 9,318,108 B2 | 4/2016 | Gruber et al. | |
| 10,171,659 B2 | 1/2019 | Riahi et al. | |
| 10,657,447 B1 | 5/2020 | McDonnell et al. | |
| 10,671,614 B2 | 6/2020 | Roytman et al. | |
| 2012/0072769 A1* | 3/2012 | Goldszmidt | G06F 11/3055 714/15 |
| 2015/0121136 A1* | 4/2015 | Namkoong | G06F 11/079 714/15 |
| 2016/0274961 A1* | 9/2016 | Thomas | G06F 40/30 |
| 2017/0011308 A1 | 1/2017 | Sun et al. | |
| 2018/0121808 A1* | 5/2018 | Ramakrishna | G06F 11/0793 |
| 2018/0189130 A1* | 7/2018 | Mowry | G06F 11/0781 |
| 2018/0218238 A1 | 8/2018 | Viirre et al. | |
| 2018/0285750 A1* | 10/2018 | Purushothaman | G06N 5/045 |

(Continued)

FOREIGN PATENT DOCUMENTS

| | | |
|---|---|---|
| WO | 2001088848 A2 | 11/2001 |
| WO | 2016057001 A1 | 4/2016 |

OTHER PUBLICATIONS

McKenna, Sean Andrew. CANARY: Event Detection Software.. United States: N. p., 2010. Web. (Year: 2010).*

(Continued)

*Primary Examiner* — Yolanda L Wilson
(74) *Attorney, Agent, or Firm* — Merchant & Gould P.C.

(57) ABSTRACT

A method of automatically resolving errors in a computing environment includes receiving, at a computing device, an error occurring within a backend of a server of the computing environment. The computing device identifies a type of the error in the backend of the server. Errors associated with the backend of the server that can be resolved by the computing device are identified using artificial intelligence. The artificial intelligence determines a resolution to the error. When the computing device is capable of implementing the resolution the computing device is allowed to automatically resolve the error.

11 Claims, 6 Drawing Sheets

(56) References Cited

U.S. PATENT DOCUMENTS

| | | | |
|---|---|---|---|
| 2018/0321997 A1* | 11/2018 | Palla | G06F 11/0709 |
| 2019/0146862 A1* | 5/2019 | Kephart | G06F 11/0709 |
| | | | 714/2 |
| 2019/0265971 A1 | 8/2019 | Behzad et al. | |
| 2019/0324831 A1* | 10/2019 | Gu | G06F 11/0778 |
| 2020/0089586 A1* | 3/2020 | Wong | G06N 5/003 |
| 2020/0117531 A1* | 4/2020 | Sudharsana | G06N 20/00 |
| 2020/0162503 A1* | 5/2020 | Shurtleff | H04L 41/0654 |
| 2020/0304636 A1 | 9/2020 | Trim et al. | |
| 2020/0311598 A1 | 10/2020 | Cmielowski et al. | |
| 2021/0004284 A1* | 1/2021 | Vah | G06F 11/079 |
| 2021/0089384 A1* | 3/2021 | Eberlein | G06F 11/302 |

OTHER PUBLICATIONS

Lee, Yung-Cheng et al., "Improvement on the dynamic ID-based remote user authentication scheme," Proceedings of the 7th International Conference on Machine Learning and Cybernetics, ICMLC, Jul. 12, 2008, v 6, p. 3283-3287.

* cited by examiner

AUTOMATED RESOLUTION ENGINE

BACKGROUND

Computing support teams often manually resolve issues that arise in computing environments, such as where access is not granted due to bad credentials or a specific database does not have the needed space allocated to it. These situations typically require manual remedial intervention, such as requiring an individual to provide updated credentials or increase the necessary space to allow a job to be completed.

SUMMARY

Embodiments are directed to automatically resolving errors in a computing environment by an automated resolution system.

In a first embodiment, a method of automatically resolving errors in a computing environment is described. The method includes receiving, at a computing device, an error occurring within a backend of a server of the computing environment. The computing device identifies a type of the error in the backend of the server. Errors associated with the backend of the server that can be resolved by the computing device are identified using artificial intelligence. The artificial intelligence determines a resolution to the error. When the computing device is capable of implementing the resolution, the computing device is allowed to automatically resolve the error.

In another embodiment, a system includes an electronic computing device including a processor, and a system memory, the system memory including instructions, which, when executed by the processor, cause the electronic computing device to perform the following steps. An error occurring within a backend of a server of the computing environment is received. A type of the error in the backend of the server is identified. Using artificial intelligence, errors associated with the backend of the server that can be resolved by the system are identified. Using the artificial intelligence, a resolution to the error is identified. When the system is capable of implementing the resolution, the system is allowed to automatically resolve the error.

In yet another embodiment, a method is implemented on an electronic computing device that is configured to automatically resolve errors in a computing environment. The method includes receiving an error occurring within a backend of a server of the computing environment, the error selected from an inadequate credential error and an out-of-space error at a computing device. A type of the error in the backend of the server at the computing device is identified. Errors associated with the backend of the server that can be resolved by the computing device using a machine-learning algorithm are identified. A resolution to the error by the machine-learning algorithm is determined. When the computing device is capable of implementing the resolution, the computing device is allowed to automatically resolve the error. A log entry including the error and the resolution implemented is generated.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The embodiments described herein are directed towards automatically addressing errors that may occur in a computing environment. Historically, individual users, such as a support team, receive error messages and manually take necessary remediation action to fix or correct the error(s). This required an individual to be on-call at all times to fix any errors that occurred in the computing environment. Further, the manual support team is required to determine the reason for the error and the correct fix. The automated resolution system as described herein is able to fix errors more quickly and efficiently than past solutions.

An automated resolution system as described herein provides numerous advantages over previous error resolving methods. The automated resolution system requires less time to fix errors that occur in the computing environment, is more cost effective than manual support teams, operates continually without downtime, more quickly identifies errors and the correct resolution, and requires less computing power. Further, the automated resolution system can be deployed across a plurality of applications in a computing environment.

In the examples described herein, a relevant computing environment can be any type of computing environment that manages and/or maintains databases and the associated physical resources and/or is used across a plurality of connected individual computing devices. Other types of computing environments include, but are not limited to, client server computing environments, distributed computing environments, cloud computing environments, and cluster computing environments.

The automated resolution system is a proactive automatic resolver tool that can fix issues that occur in a backend of a server, otherwise referred to herein as errors. General types of errors that the automated resolution system can fix include syntax errors, semantic errors, and logical errors. More specifically, errors may include time-out problems, space issues, lack of permission issues, directory address issues, and other similar problems. The automated resolution system is an automated system that identifies errors and automatically fixes the errors. The automated resolution system comprises a plurality of modules, each directed towards fixing at least one type of error. For example, modules include those directed to fixing log space errors, lack-of-memory errors, periodic health check errors, namenode heap space errors, and too-many-files-open errors. Other modules directed towards fixing other types of errors are also contemplated. Still further, over time additional modules may be added to the automated resolution system as it becomes capable of fixing more errors.

The automated resolution system can ensure that simple errors are self-corrected, including, but not limited to, database space issues and application access problems. The automated resolution system also ensures that its capabilities continue to learn to expand its self-correction capabilities. The automated resolution system is a machine-learning model that is trained initially with past error logs that include the resolution for each error encounter within the computing environment.

The automated resolution system can be implemented using a machine-learning or artificial intelligence (AI) model. Utilizing the AI model, a manual production support team is not required. Specific implementation targets include ensuring that simple errors are self-corrected by the automated resolution system, such as database space allocation errors and application access errors. Further, the use of AI and/or a machine-learning model allows the automated resolution system to learn over time to expand self-correction capabilities. More specifically, the automated resolution system is an autonomous production engine that learns in the computing environment itself and continually learns, as the AI/machine-learning model matures in its handling and resolution of errors. Additionally, the automated resolution system documents each error and resolution so as to preserve audit logs.

Figure 1:
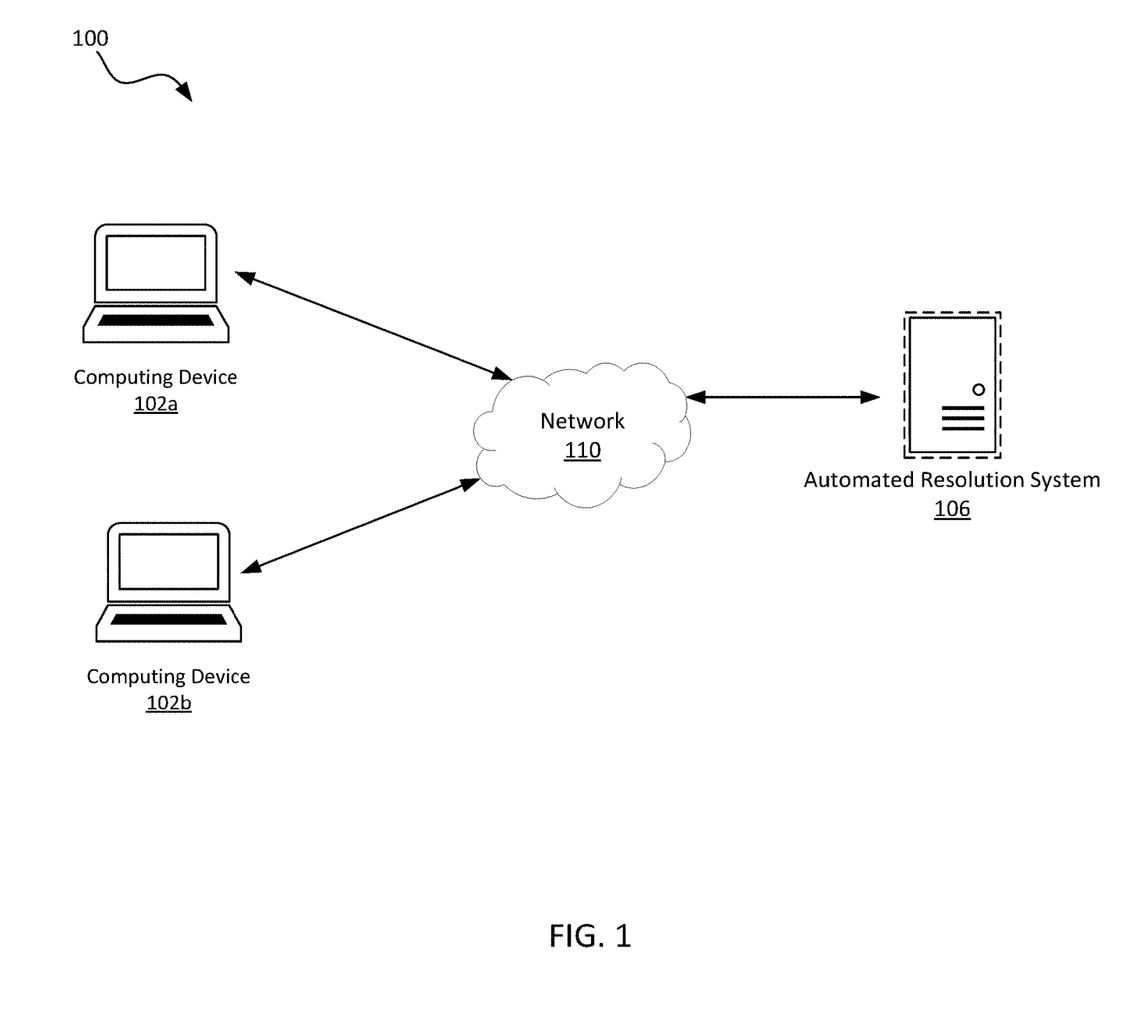
FIG. 1 illustrates an example environment for implementing an automated resolution system.

FIG. 1 illustrates an example environment 100 for implementing a system for the automated resolution of errors according to embodiments described herein. The environment 100 includes a network 110 connecting a first computing device 102a and a second computing device 102b with an automated resolution system 106. In an example, the computing devices 102a, 102b are associated with a Hadoop distribution environment, where errors are likely to occur. In other examples, the computing devices 102a, 102b are associated with any type of computing environment, as described above. In an embodiment, different types of errors may be corrected by different modules distributed within the automated resolution system 106, which is described in more detail below at FIG. 2.

The example network 110 is a computing device network that may include the Internet, private networks, and a combination thereof. In some arrangements, the network 110 includes wired and/or wireless networks. As noted, in this example, the computing devices 102a, 102b communicate with the automated resolution system 106 using the network 110.

The automated resolution system 106 executes one or more software applications designed to automatically fix errors that occur in the computing environment. In an example implementation, errors refer to any type of issues that arise when other software programs are put into operation for their intended use by end users, which is described herein as "common production situations." Errors in common production situations often occur when access to a specific software program is denied due to inaccurate credentials of the requestor, or a database does not have the needed space allocated to it. In another example implementation, errors that occur in other aspects of computing are identifiable and fixable by the automated resolution system 106.

In some implementations, one of the software applications executed by the automated resolution system 106 utilizes AI. AI can be helpful in identifying the errors quickly and efficiently to provide a known solution. In other implementations, the automated resolution system 106 executes a software application containing a machine-learning software application that is capable of learning common errors within a computing environment and learning the resolutions to fix the errors.

The automated resolution system 106 is a self-learning solution (i.e., utilizing AI or machine learning algorithm) that is capable of continual learning through past error logs, as well as experiences in resolving errors. For example, and is described in more detail below, the automated resolution system 106 can resolve common errors such as access errors, space errors, permission errors, directory errors, and lookup-files-not-available errors. Over time, the automated resolution system 106 can proactively resolve issues before an error actually occurs. For example, additional space may be allocated to applications before the application runs out of space, or ensuring encryption standards are being adhered to within the computing environment.

Figure 2:
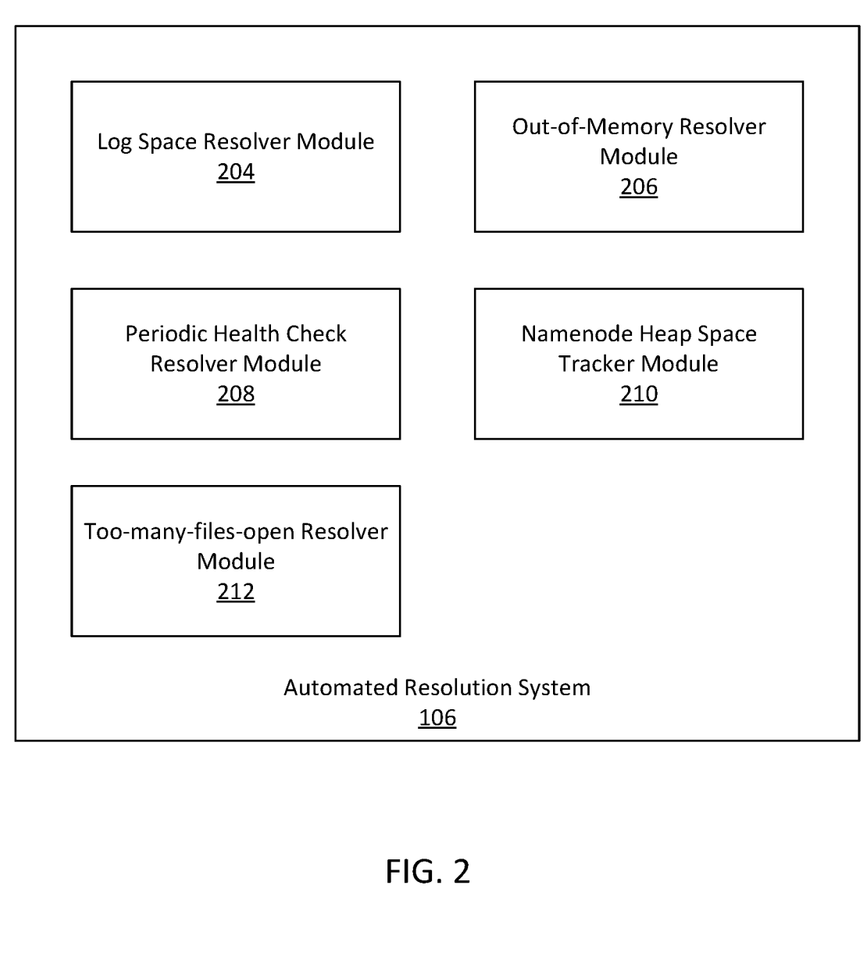
FIG. 2 illustrates an example block diagram of the automated resolution system of FIG. 1.

FIG. 2 illustrates an example block diagram of logical modules of the automated resolution system 106. The automated resolution system 106 contains a plurality of individual modules configured to resolve specific errors. As shown, the automated resolution system 106 contains a log space resolver module 204, an out-of-memory resolver module 206, a periodic health check resolver module 208, a namenode heap space tracker module 210, and a too-many-files-open resolver module 212. Additionally, other specific modules are possible. As the automated resolution system 106 learns over time, additional modules can be included to fix other types of errors. Each of the modules is capable of machine-learning/AI to improve the capabilities of the modules over time.

The log space resolver module 204 is capable of correcting errors related to log space. For example, if a log is completely filled or if records are being written to the log faster than the log can process, an error message is identified by the automated resolution system 106. The automated resolution system 106, with use of the log space resolver module 204, is capable of correcting such an error, for example, by increasing the number of log files or reducing the amount of data being processed by a queue manager.

The out-of-memory resolver module 206 resolves errors associated with insufficient memory allocation. For example, an error may occur when an allotted amount of memory is insufficient. The automated resolution system 106 identifies the error, and the out-of-memory resolver module 206 allocates additional memory where needed. In an example embodiment, based upon previous errors and resolutions, the out-of-memory resolver module 206 learns that allocating an additional 10% of space can resolve the error.

In a further embodiment, when the out-of-memory resolver module 206 is a machine-learning model/AI model, the out-of-memory resolver module 206 learns when past fixes are not sufficient. In an example, the machine-learning model is capable of learning and improving from past experiences. The machine-learning/AI model explores past errors and fixes, to identify patterns, and is capable of discerning the patterns to determine which fixes are sufficient to fix the errors.

In an example, the machine-learning/AI model learns by identifying a pattern that allocating an additional 10% of space is not enough to resolve an out-of-memory error, because the error is occurring too often. For example, an error that is occurring once per day is occurring too often. If the error is occurring every day, the out-of-memory resolver module 206 can allocate an additional amount of space each time until the error stops occurring every day. The out-of-memory resolver module 206 can then learn to allocate an increased amount of space, such as 15% or 20% additional space when the same error is occurring too often. An error that is occurring once per week may not be occurring too often. If the out-of-memory error occurs less frequently, then the machine-learning/AI model learns that this increased amount of allocated space is sufficient to fix the error. If the machine-learning/AI model learns that the error continues to occur too frequently, even more space can be allocated until the error stops occurring too frequently.

In yet a further embodiment, the out-of-memory resolver module 206 may not be capable of resolving the error, for example, when allocating additional space does not mitigate the error, or if allocating additional space creates an additional error.

An example of when the out-of-memory resolver module 206 cannot resolve the error includes a situation when an error message indicates that the server itself does not have enough available memory for storing a database or other job. If the server itself does not have enough physical memory, the out-of-memory resolver module 206 is unable to fix the issue. When an error is unable to be fixed, the automated resolution system 106 generates a notification and sends the notification to a support team. The support team can resolve the error, and then the automated resolution system 106 is capable of learning the fix to an error that it was previously unable to fix.

The periodic health check resolver module 208 is capable of fixing issues that are associated with a service level health test that checks basic operations to ensure they are working correctly and are completing tasks in a reasonable amount of time. For example, the periodic health check resolver module 208 is capable of resolving errors associated with a canary application. Common errors include a connection timeout, an operation timeout, a session timeout, a root path error, and a connection error. See FIG. 5 for additional details. As described above with regard to the machine-learning/AI model of the out-of-memory resolver module 206, the periodic health check resolver module 208 also includes machine-learning/AI capabilities that allow it to continually improve error resolving capabilities.

A namenode heap space tracker module 210 is capable of resolving errors associated with a Hadoop server. Example types of errors that the namenode heap space tracker module 210 is capable of fixing include errors associated with the file system layout, such as files, blocks, directories, permissions, and the location of the blocks. In an example, the namenode heap space tracker module 210 identifies changes occurring in the processes running on the Hadoop server. Then the namenode heap space tracker module 210 monitors application usage of blocks used to write outputs information, and captures errors through periodic checks. As described above with regard to the machine-learning/AI model of the out-of-memory resolver module 206, the namenode heap space tracker module 210 also includes machine-learning/AI capabilities that allow it to continually improve error resolving capabilities. In an example, the namenode heap space tracker module 210 maintains the location of the checks to enable the machine-learning/AI to continue learning.

The too-many-files-open resolver module 212 is capable of resolving issues that are caused when too many files are open in a particular environment. For example, the too-many-files-open resolver module 212 is capable of increasing an open file limit when a too-many-files-open error occurs. In another example, the too-many-files-open resolver module 212 is capable of closing unused files automatically. As described above with regard to the machine-learning/AI model of the out-of-memory resolver module 206, the too-many-files-open resolver module 212 also includes machine-learning/AI capabilities that allow it to continually improve error resolving capabilities.

The automated resolution system 106 automatically fixes errors when it is able, and then reports a log of the results, the log incudes both the error and the fix used. If the automated resolution system 106 is not capable of automatically fixing an error, then a notification is generated and is sent to a manual support team. The notification includes pertinent information, such as the error, the date and time of the error, and, if a resolution was attempted, what the resolution attempt was.

The automated resolution system 106 also generates a notification and sends it to a manual support team when a fix to an error does not work, or when the fix attempted creates a new error. The notification includes pertinent information, such as the error, the date and time of the error, what fix was attempted, and what happened after the fix was attempted, such as including the subsequent error that occurred.

Figure 3:
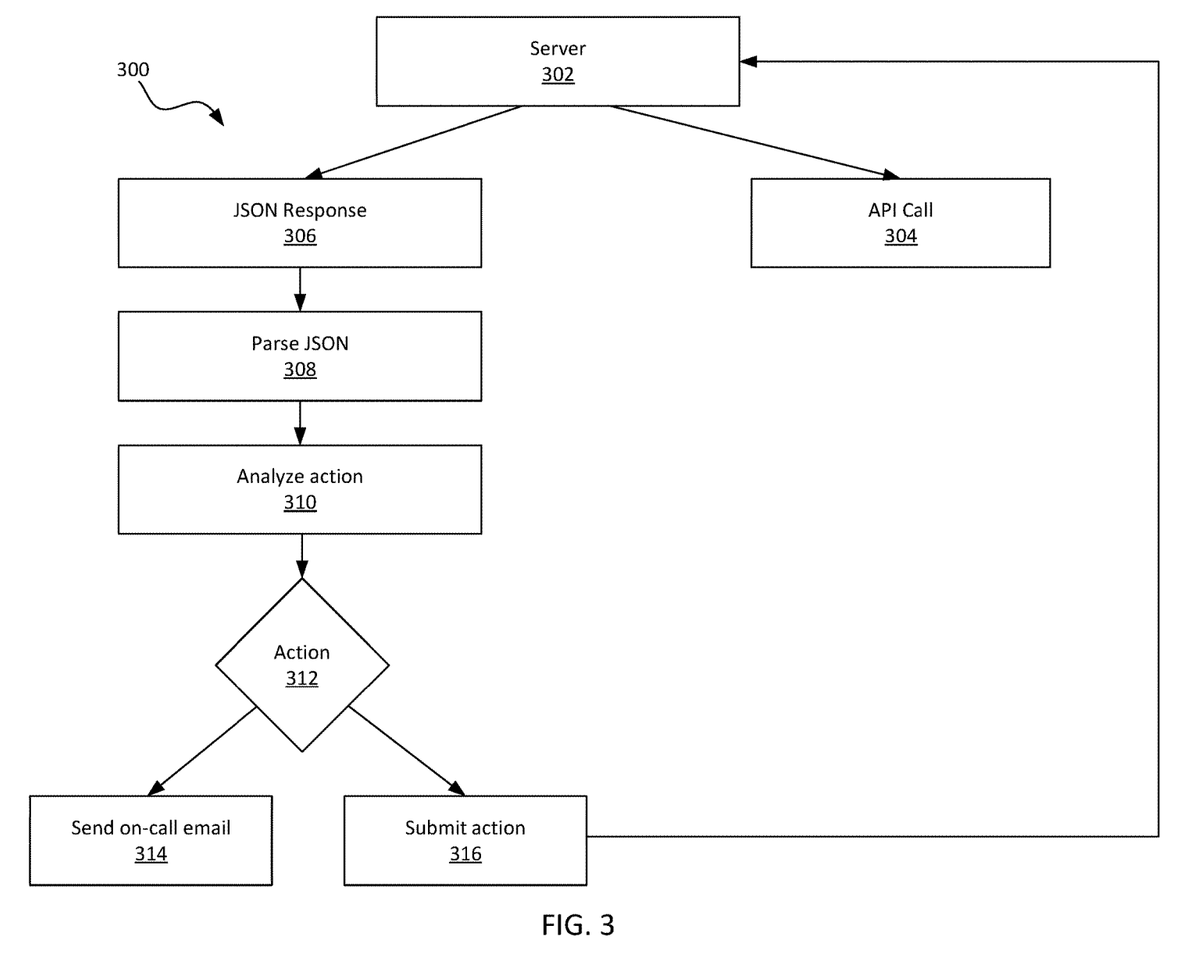
FIG. 3 illustrates is an example use method of the automated resolution system of FIG.

FIG. 3 is an example method 300 of collecting previous alerts and errors within the computing environment. The method 300 is directed towards identifying and sorting the errors that can be proactively and automatically resolved by the automated resolution system 106. The example method 300 includes a server that includes at least one computing device 102a, 102b and the automated resolution system 106.

At step 302, the server, including the automated resolution system 106 monitors and waits for errors to occur or issues to arise. The server may be a server capable of managing Hadoop software utilities. In an example embodiment utilizing the automated resolution system 106, the server waits to receive and identify an error message. The automated resolution system 106 resides within the server of step 302.

The server, at step 302 receives a call, and when no errors or issues are associated with the call, the method 300 moves to step 304. At step 304, an application programming interface (API) is called and the request of the call is processed. The API call is a canary process that runs constantly.

When the server, at step 302, receives a call, and an error or issue occurs, the method 300 moves to step 306. At step 306, a JavaScript object notation (JSON) response occurs. The JSON response includes having the automated resolution system 106 receive a notification of an error. The notification includes the error and any other related information such as the location of the error, the date, and the time of the error.

At step 308, the JSON response is parsed. The automated resolution system 106 may parse the JSON response, to ultimately determine which module can resolve the issue.

At step 310, the action required to mitigation or fix the error is analyzed. This can occur, for example, at the automated resolution system 106, or may occur at one of the individual modules residing within the automated resolution system 106.

At step 312, it is determined whether or not the automated resolution system 106 is capable of automatically performing the action needed to mitigate or fix the error.

If the automated resolution system 106 is not capable of automatically mitigating or fixing the error, then the process moves to step 314. At step 314, a notification is sent to a resolution module manager. A resolution module manager may be an individual user, such as a member of a support team as described above. The automated resolution system 106 may not be capable of fixing an error when previous fixes result in additional errors or when the automated resolution system 106 is not allowed to fix the error.

For example, if an out-of-space error keeps occurring and each time the automated resolution system 106 allocates an additional 10% space, but this fix is always temporary, the automated resolution system 106 may not fix the error the next time. Instead, the automated resolution system 106 generates and sends a notification to the resolution module manager. Then, the automated resolution system 106 learns from the error log how the resolution module manager fixes the error, so the automated resolution system 106 is capable of fixing the error the next time it occurs.

Other examples of when the automated resolution system 106 is not capable of fixing an error is when a system error occurs. When a system error occurs, the automated resolution system 106 generates and sends a notification to the resolution module manager, who is able to fix the error. The automated resolution system 106 logs the error in the error log, even if the automated resolution system 106 is not capable of fixing system errors in the future.

If the automated resolution system 106 is capable of automatically mitigating or fixing the error, then the method 300 moves to step 316. At step 316, the error is resolved. The automated resolution system 106 logs the error and the resolution.

After the error and resolution is logged, the method 300 moves back to step 302 where the server waits to identify the next error message.

The automated resolution system 106 functions as a "canary" system, where it waits and watches for errors to occur before automatically acting. When an error occurs, the automated resolution system 106 receives the error and identifies where the error is occurring, and which module is capable of resolving the error. Additionally, the automated resolution system 106 is capable of proactively automatically acting before an error occurs, based on its machine-learning/AI capabilities as described above.

Further, the automated resolution system 106 is not associated with a user interface, as it is designed to function automatically without user intervention.

Figure 4:
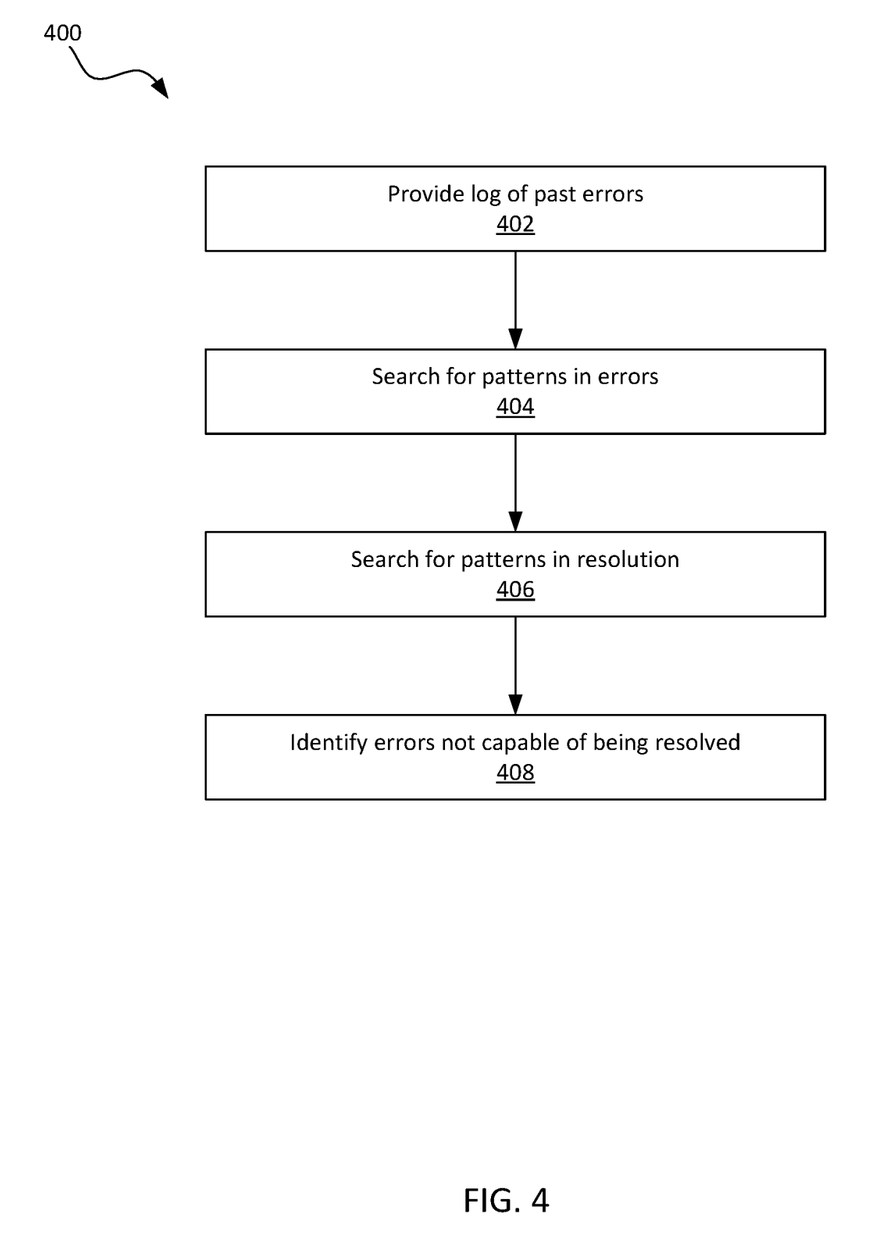
FIG. 4 illustrates an example method of training the automated resolution system of FIG. 1.

FIG. 4 illustrates an example method 400 of training the automated resolution system 106 to automatically resolve errors and to proactively resolve possible issues.

At step 402, a log of past errors is initially provided to the automated resolution system 106. The automated resolution system 106 executes one or more software applications that utilize a machine-learning/AI application that utilizes the error logs as a training mechanism.

At step 404, the automated resolution system 106 searches for patterns of the errors provided in the error logs. Example errors include inadequate space in a database or lack of permission; however, a plurality of other types of errors are contemplated. The automated resolution system 106 also searches for patterns including a day and/or time of the error. Still further, the automated resolution system 106 may search for additional patterns related to errors that will eventually help it identify errors at a later date, enabling the automated resolution system 106 to proactively fix problems before the problems becomes an error.

At step 406, the automated resolution system 106 searches for resolution patterns within the error logs. Example resolutions include allotting more space to a database, or allowing permission to a specific module. The automated resolution system 106 searches for patterns associated with the specifics of fixing an error, such as how much more space needs to be allocated to database that has run out of space.

At step 408, the automated resolution system 106 identifies errors that it cannot resolve or fix. For example, if the automated resolution system 106 identifies when a resolution to an error creates a subsequent error, the automated resolution system 106 would not employ that specific resolution. The automated resolution system 106 also identifies when it does not have permission to resolve a specific error.

In an example embodiment, where an individual of a manual support team fixes the error because the automated resolution system 106 cannot, the automated resolution system 106 is then fed additional training information from the individual via the error log. This ensures that the automated resolution system can fix the error the next time the error occurs.

After the initial error logs are provided for training, the automated resolution system 106 continues its machine-learning/AI capabilities by continued training with current error logs, including errors that are fixed by the automated resolution system 106 itself.

Figure 5:
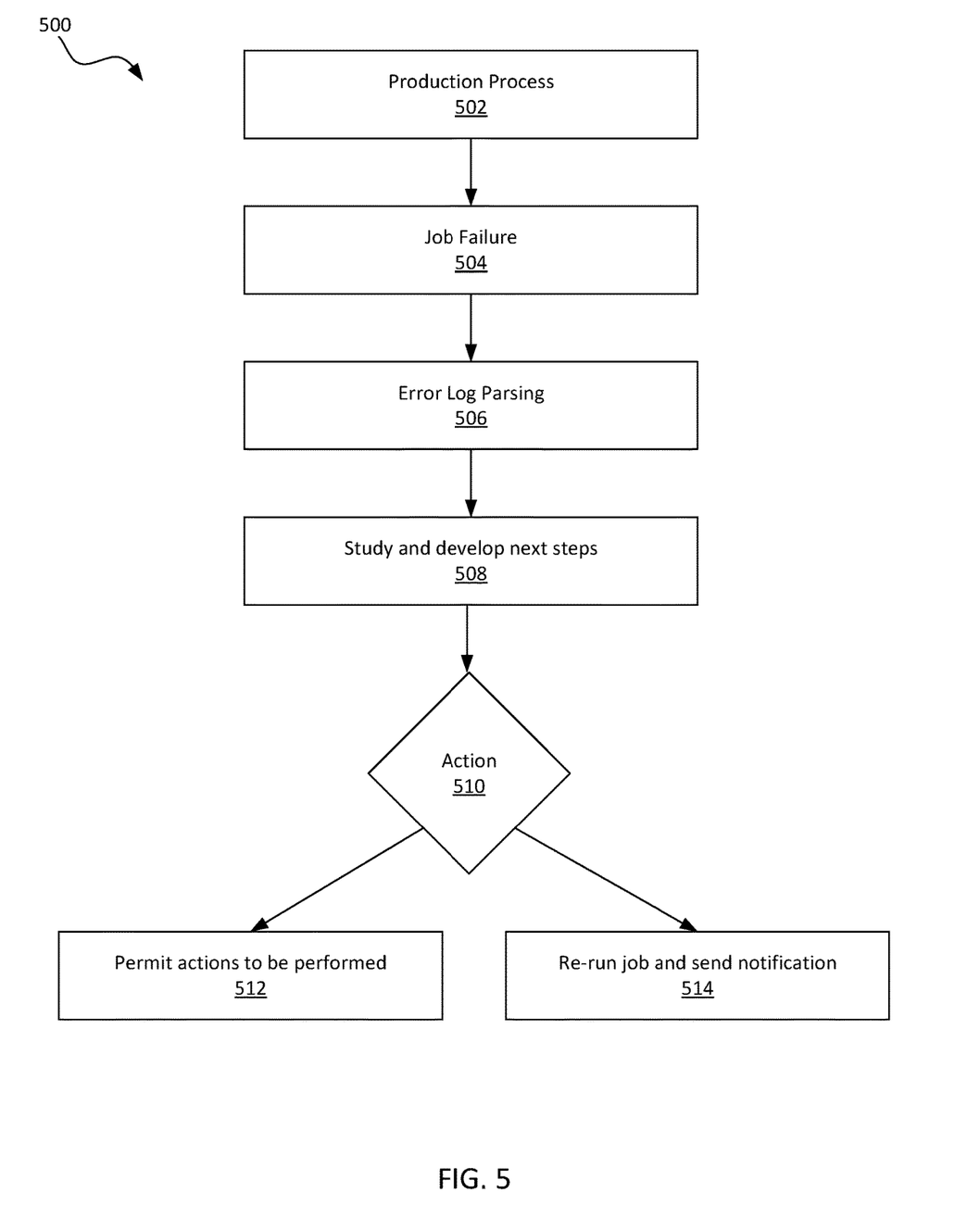
FIG. 5 illustrates an example method of the automated resolution system of FIG. 1 acting as a canary process monitoring system.

FIG. 5 illustrates an example method 500 of the automated resolution system 106 acting as a canary process monitoring system. At step 502, the automated resolution system 106 continually monitors for any type of error that occurs within the computing environment. The automated resolution system 106 is not reliant on individual software applications or individual hardware components providing a notification, but instead the automated resolution system 106 identifies when an error has occurred by monitoring the entire computing system.

At step 504, a job failure or error occurs. A job failure or error is any type of error that occurs within the computing system. Example types of errors include lack of memory errors, authorization denial, log space errors, periodic health check errors, namenode heap space errors, and too-many-filed-open errors.

At step 506, the error log is parsed by the automated resolution system 106. In an embodiment, the machine-learning/AI software application of the automated resolution system 106 deciphers the parsed log by skimming through the error log automatically. The automated resolution system 106 analyzes the error log to find the cause of the error.

At step 508, the automated resolution system 106 studies and develops the next appropriate step(s) with regard to the error identified. Studying the error includes determining which type of error occurred, and which module within the automated resolution system 106 is capable of fixing the error. Studying the error also includes comparing it to past errors to determine an appropriate fix.

Once the appropriate fix or resolution is determined for the error, the appropriate strategy is developed for fixing the error. The strategy includes determining which module within the automated resolution system 106 is most suitable for fixing the error. The strategy also includes determining when to fix the error, determining whether the automated resolution system 106 has permission to fix the error, and whether the automated resolution system 106 is actually capable of fixing the error.

At step 510, the automated resolution system 106 determines whether or not it can automatically take an action that resolves the error.

If the automated resolution system 106 is capable of resolving the error, then the method 500 moves to step 512. At step 512, the automated resolution system 106 is permitted to perform actions necessary to fix the error. When the automated resolution system 106 fixes the error, the error and resolution are logged for further learning capabilities.

If the automated resolution system 106 is not capable of resolving the error, then the method 500 moves to step 514. At step 514, the automated resolution system 106 generates and sends a notification to the manual support team.

Figure 6:
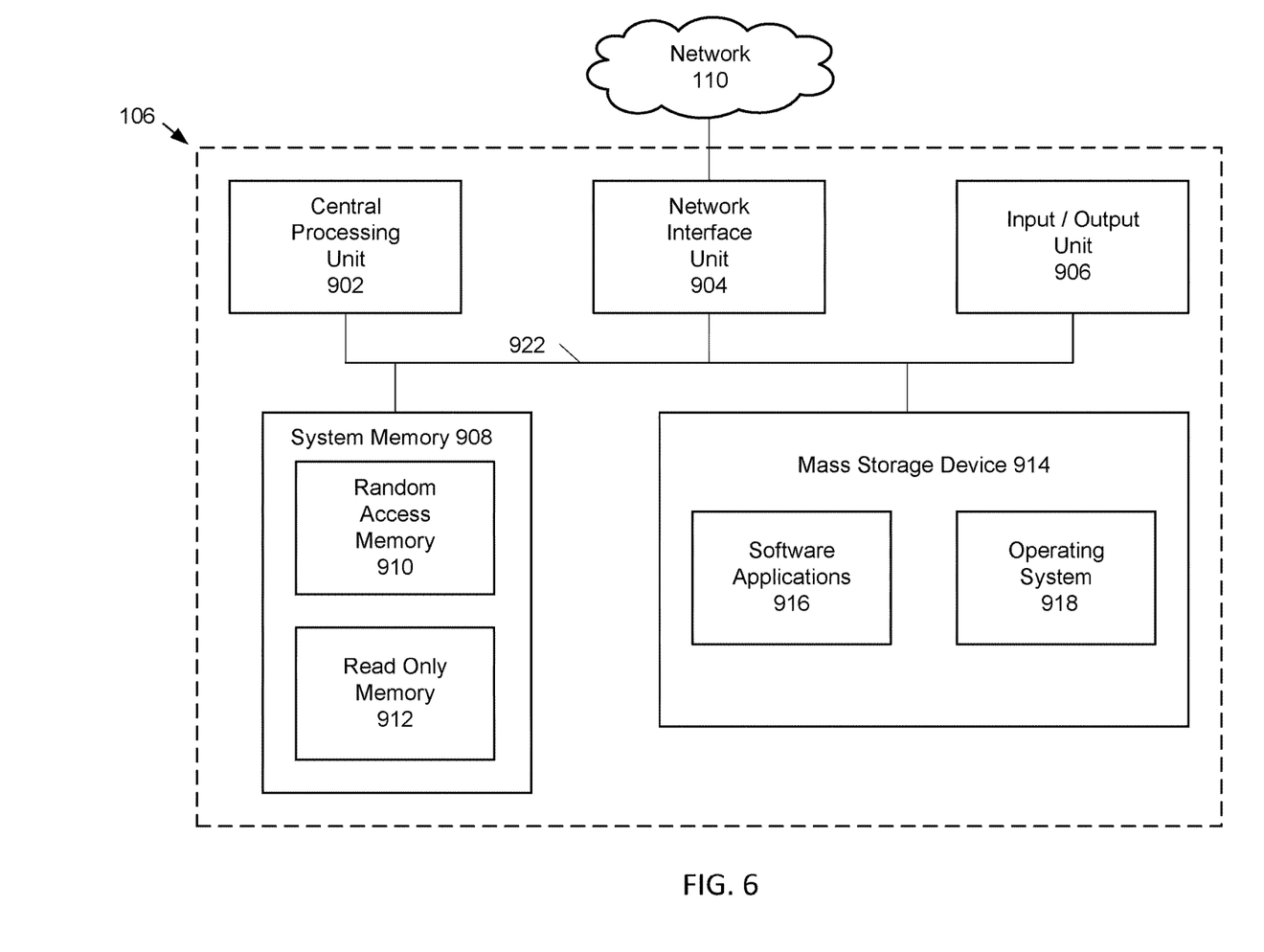
FIG. 6 illustrates example components of a computing device of the automated resolution system of FIG. 1.

As illustrated in FIG. 6, example physical components of the automated resolution system 106 are shown. Other computing devices (e.g., the computing device 102*a* or computing device 102*b*) can be configured in a similar manner.

The automated resolution system 106 includes at least one central processing unit ("CPU") 902, also referred to as a processor, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the automated resolution system 106, such as during startup, is stored in the ROM 912. The automated resolution system 106 further includes a mass storage device 914. The mass storage device 914 is able to store software instructions and data.

The mass storage device 914 is connected to the CPU 902 through a mass storage controller (not shown) connected to the system bus 922. The mass storage device 914 and its associated computing device-readable data storage media provide non-volatile, non-transitory storage for the automated resolution system 106. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program applications or other data. Example types of computer-readable data storage media include, but are not limited to, random access memory ("RAM"), read-only memory ("ROM"), erasable programmable read-only memory ("EPROM"), electrically erasable programmable read-only memory ("EEPROM"), flash memory or other solid state memory technology, compact disc read-only memory ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the automated resolution system 106.

According to various embodiments, the automated resolution system 106 may operate in a networked environment using logical connections to remote network devices through the network 110, such as the Internet, or another type of network. The automated resolution system 106 may connect to the network 110 through a network interface unit 904 connected to the system bus 922. It should be appreciated that the network interface unit 904 may also be utilized to connect to other types of networks and remote computing systems. The automated resolution system 106 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the automated resolution system 106 can store software instructions and data. The software instructions include an operating system 918 suitable for controlling the operation of the automated resolution system 106. The mass storage device 914 and/or the RAM 910 also store software instructions and software applications 916, that when executed by the CPU 902, cause automated resolution system 106 to provide the functionality discussed in this document.

Generally, the automated resolution system 106 described above, provides a proactive automatic resolver tool that can fix errors without a user intervening. The automated resolution system 106 learns from historical error logs as well as past error resolution activity via machine-learning/AI capabilities. When an error occurs in a computing environment, the automated resolution system 106 fixes the error and then preserves the activity in an error log.

Embodiments of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure in any way. The embodiments, examples, and details provided in this application are considered sufficient to convey possession and enable others to make and use the disclosed embodiments. The disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the disclosure and the general inventive concept embodied in this application that do not depart from the broader scope.

What is claimed is:

1. A method of automatically resolving errors in a computing environment, the method comprising:

receiving, at a computing device, an error occurring within a backend of a server of the computing environment;

identifying, at the computing device, a type of the error in the backend of the server;

identifying, using artificial intelligence, errors associated with the backend of the server that can be resolved by the computing device;

determining, by the artificial intelligence, a resolution to the error;

when the computing device is capable of implementing the resolution, allowing the computing device to automatically resolve the error; and when the resolution to the error creates a new error, the computing device does not implement the resolution to the error, and the method further comprises:

generating a notification comprising the error, the resolution, and the new error; and sending the notification to a resolution module manager.

2. The method according to claim 1, wherein the artificial intelligence comprises a machine-learning algorithm.

3. The method according to claim 1, wherein the method further comprises generating a log entry including the error and the resolution implemented.

4. The method according to claim 1, wherein when the computing device cannot resolve the error, the method further comprises:

generating the notification comprising the error; and
sending the notification to the resolution module manager.

5. The method according to claim 1, wherein determining whether the computing device is capable of implementing the resolution includes determining whether the computing device has permission to implement the resolution.

6. The method according to claim 1, wherein the computing device comprises a plurality of modules, each module capable of fixing different clusters of errors.

7. The method according to claim 1, wherein determining the resolution to the error comprises reviewing a historical error log to identify a historical resolution for the error.

8. The method according to claim 1, wherein the computing device comprises a canary processing monitoring application.

9. A method of automatically resolving errors in a computing environment, the method comprising:

receiving, at a computing device, an error occurring within a backend of a server of the computing environment identifying, at the computing device, a type of the error in the backend of the server;

identifying, using artificial intelligence, errors associated with the backend of the server that can be resolved by the computing device;

determining, by the artificial intelligence, a resolution to the error;

when the computing device is capable of implementing the resolution, allowing the computing device to automatically resolve the error; and when the error persists after the computing device has implemented the resolution, the method further comprises:

generating a notification comprising the error and the resolution; and sending the notification to a resolution module manager.

10. A method of automatically resolving errors in a computing environment, the method comprising:

receiving, at a computing device, an error occurring within a backend of a server of the computing environment, the error selected from an inadequate credential error and an out-of-space error;

identifying, at the computing device, a type of the error in the backend of the server;

identifying, using a machine-learning algorithm, errors associated with the backend of the server that can be resolved by the computing device;

determining, by the machine-learning algorithm, a resolution to the error;

when the computing device is capable of implementing the resolution, allowing the computing device to automatically resolve the error;

when the resolution to the error creates a new error, not implementing the resolution to the error, including:

generating a notification comprising the error, the resolution, and the new error; and sending the notification to a resolution module manager; and generating a log entry including the error and the resolution implemented.

11. The method according to claim 10, wherein when the computing device cannot resolve the error, the method further comprises:

generating the notification comprising the error; and
sending the notification to the resolution module manager.

* * * * *

UNITED STATES PATENT AND TRADEMARK OFFICE
CERTIFICATE OF CORRECTION

PATENT NO. : 11,397,629 B1
APPLICATION NO. : 17/142571
DATED : July 26, 2022
INVENTOR(S) : Rajesh Koneru It is certified that error appears in the above-identified patent and that said Letters Patent is hereby corrected as shown below:

In the Specification

Column 2, Line 12: delete "FIG." and insert --FIG. 1.--

In the Claims

Column 12, Lines 2-3, Claim 9: delete "environment" and insert --environment;--

Signed and Sealed this
Second Day of May, 2023

Katherine Kelly Vidal
*Director of the United States Patent and Trademark Office*